(12) United States Patent
Watanabe et al.

(10) Patent No.: US 11,015,709 B2
(45) Date of Patent: May 25, 2021

(54) GASKET AND SEALING STRUCTURE

(71) Applicant: NOK CORPORATION, Tokyo (JP)

(72) Inventors: Takeshi Watanabe, Nihonmatsu (JP);
Tomoyuki Koyama, Nihonmatsu (JP);
Ryoko Saito, Nihonmatsu (JP)

(73) Assignee: NOK CORPORATION, Tokyo (JP)

( * ) Notice: Subject to any disclaimer, the term of this patent is extended or adjusted under 35 U.S.C. 154(b) by 97 days.

(21) Appl. No.: 16/477,115

(22) PCT Filed: Jan. 10, 2018

(86) PCT No.: PCT/JP2018/000238
§ 371 (c)(1),
(2) Date: Jul. 10, 2019

(87) PCT Pub. No.: WO2018/135341
PCT Pub. Date: Jul. 26, 2018

(65) Prior Publication Data
US 2019/0360589 A1    Nov. 28, 2019

(30) Foreign Application Priority Data

Jan. 18, 2017 (JP) .............................. JP2017-006486

(51) Int. Cl.
*F16J 15/10* (2006.01)
*F16J 15/06* (2006.01)
*B29L 31/26* (2006.01)

(52) U.S. Cl.
CPC ............. *F16J 15/061* (2013.01); *F16J 15/10* (2013.01); *B29L 2031/265* (2013.01)

(58) Field of Classification Search
CPC .. F16J 15/06; F16J 15/061; F16J 15/10; F16J 15/102; F16J 15/104
See application file for complete search history.

(56) References Cited

U.S. PATENT DOCUMENTS 3,334,774 A * 8/1967 Poltorak ............... F16J 15/106
220/378
5,957,100 A * 9/1999 Frohwerk ............... F02F 7/006
123/90.37

(Continued)

FOREIGN PATENT DOCUMENTS

DE    102008024265 A1    11/2009
DE    102011081973 A1    3/2013

(Continued)

OTHER PUBLICATIONS

German Office Action dated Feb. 27, 2020 (corresponding to DE 11 2018 000 415.5).

*Primary Examiner* — Gilbert Y Lee
(74) *Attorney, Agent, or Firm* — Harness, Dickey & Pierce, P.L.C.

(57) ABSTRACT

A gasket 100 is configured to seal a gap between an installation member 200 and a fixation member 300 which are fixed to each other. The gasket 100 has an annular gasket main body 11 configured to be fitted into an annular groove 210 provided in the installation member 200 and configured to be in close contact with a bottom surface 210a of the annular groove 210 and with an end surface 310 of the fixation member 300, and an auxiliary seal portion 12 extending from the gasket main body 11 toward an opposite region, which is opposite to a sealed region. The auxiliary seal portion 12 is configured to be in close contact with an end surface 220 of the installation member 200 on the opposite region side of the annular groove 210 and with the end surface 310 of the fixation member 300.

12 Claims, 9 Drawing Sheets

(56) References Cited

U.S. PATENT DOCUMENTS

| | | | |
|---|---|---|---|
| 7,648,041 B2* | 1/2010 | Ueda | H01L 21/67126 |
| | | | 220/378 |
| 10,473,218 B2* | 11/2019 | Dore | F16J 15/025 |
| 2010/0126304 A1 | 5/2010 | Sahm et al. | |
| 2019/0049015 A1 | 2/2019 | Mackel et al. | |

FOREIGN PATENT DOCUMENTS

| | | |
|---|---|---|
| DE | 02016105047 A1 | 9/2017 |
| JP | S60-162245 U | 10/1985 |
| JP | H04-064661 U | 6/1992 |
| JP | H05-001087 U | 1/1993 |
| JP | H06-281013 A | 10/1994 |
| JP | 2003-156151 A | 5/2003 |
| JP | 2012-107667 A | 6/2012 |
| JP | 2014-109284 A | 6/2014 |
| WO | 2013-029811 A1 | 3/2013 |

* cited by examiner

GASKET AND SEALING STRUCTURE

CROSS-REFERENCE TO RELATED APPLICATIONS

This application is a National Phase of International Application No. PCT/JP2018/000238, filed Jan. 10, 2018 (now WO 2018/135341A1), which claims priority to Japanese Patent Application No. 2017/006486, filed Jan. 18, 2017. The entire disclosures of the above applications are incorporated herein by reference.

FIELD

The present disclosure relates to a gasket for sealing a gap between two members fixed to each other and to a sealing structure.

BACKGROUND

Gaskets for sealing gaps between two members fixed to each other has been widely used in various devices to prevent intrusion of foreign materials or fluid from the outside of the devices into the inside thereof. A known gasket will be described referring to FIGS. 8 and 9. FIG. 8 is a schematic cross-sectional view of the gasket. FIG. 9 is a schematic cross-sectional view of a sealing structure including the gasket.

A gasket 500 is used to seal a gap between two members fixed to each other. For brevity, the two members are referred to respectively as an installation member 200 and a fixation member 300. The gasket 500 includes an annular gasket main body 510. The gasket main body 510 has annular seal projections 511 and 512 on one end side and the other end side thereof, respectively. The gasket main body 510 of the gasket 500 is fitted into an annular groove 210 provided in the installation member 200. When the installation member 200 and the fixation member 300 are fixed to each other, the seal projection 511 is in close contact with the bottom surface of the annular groove 210, while the seal projection 512 is in close contact with an end surface 310 of the fixation member 300. Thus, the gap between the installation member 200 and the fixation member 300 is sealed. In other words, the inside (I) of a device and the outside (O) of the device are isolated from each other.

Long-life sealing performance by gaskets against a corrosive solution, such as a snow melting agent, sea water, or salt water has been awaited, especially in the field of vehicles for example, to prevent a malfunction of vehicles such as a short circuit due to intrusion of the corrosive solution into a device having an electronic component inside. Such corrosion comes to an issue in the sealing structure having the installation member 200 and the fixation member 300 made of aluminum alloy or magnesium alloy. Members made of aluminum, for example, may be corroded by a corrosive solution adhering to and remaining near arrows S1 and S2 in FIG. 9 through multiple drying and moistening. This results from difference in ion concentration in the corrosive solution ($Al3++3H2O \rightarrow AL(OH)3+3H+$). Progression of such corrosion makes the outside (O) of the device and the inside (I) of the device be communicated with each other through a corroded portion in a sealed surface, thereby the sealing performance decreases.

CITATION LIST

Patent Literature

[PTL 1] Japanese Patent Application Publication No. 2003-156151

SUMMARY

Technical Problem

An object of the present disclosure is to provide a gasket and a sealing structure which improves durability of the sealing performance.

Solution to Problem

To solve the problem described above, the present disclosure adopts the following means.

An aspect of the present disclosure is a gasket configured to seal a gap between two members fixed to each other, one of the two members being an installation member in which the gasket is to be installed; and the other of the two members being a fixation member which is to be fixed to the installation member, the gasket including: an annular gasket main body configured to be fitted into an annular groove provided in the installation member and configured to be in close contact with a bottom surface of the annular groove and with an end surface of the fixation member; and an auxiliary seal portion extending from the gasket main body toward an opposite region, which is opposite to a sealed region, the auxiliary seal portion being configured to be in close contact with an end surface of the installation member on the opposite region side of the annular groove and with the end surface of the fixation member.

The auxiliary seal portion extends from the gasket main body toward the opposite region. This causes sealing performance provided by the auxiliary seal portion to be impaired first under an environment in which a corrosive solution may cause corrosion, and then sealing performance provided by the gasket main body is caused to be impaired. Thus, durability of the sealing performance provided by the gasket as a whole can be improved.

The auxiliary seal portion may include: an annular projection on the installation member side which is configured to be in close contact with the end surface of the installation member; and an annular projection on the fixation member side which is configured to be in close contact with the end surface of the fixation member.

The auxiliary seal portion may have a plurality of the projection on the installation member side. Further, the auxiliary seal portion may have a plurality of the projection on the fixation member side.

The gasket main body may have an annular projection on the inner peripheral side projecting toward the sealed region at a position opposite to the auxiliary seal portion.

This inhibits reaction force of the gasket main body from being reduced.

The gasket main body may have an annular seal projection on the end surface side of the fixation member, the annular seal projection having a plane with a tip end configured to be in close contact with the end surface of the fixation member.

This increases the contacting area between the end surface of the fixation member and the annular seal projection. Thus, the durability of the sealing performance provided by the annular seal projection.

The above-described features may be adopted in any feasible combination.

Advantageous Effects of the Disclosure

As described above, the present disclosure improves durability of the sealing performance.

DRAWINGS

DETAILED DESCRIPTION

Figure 1:
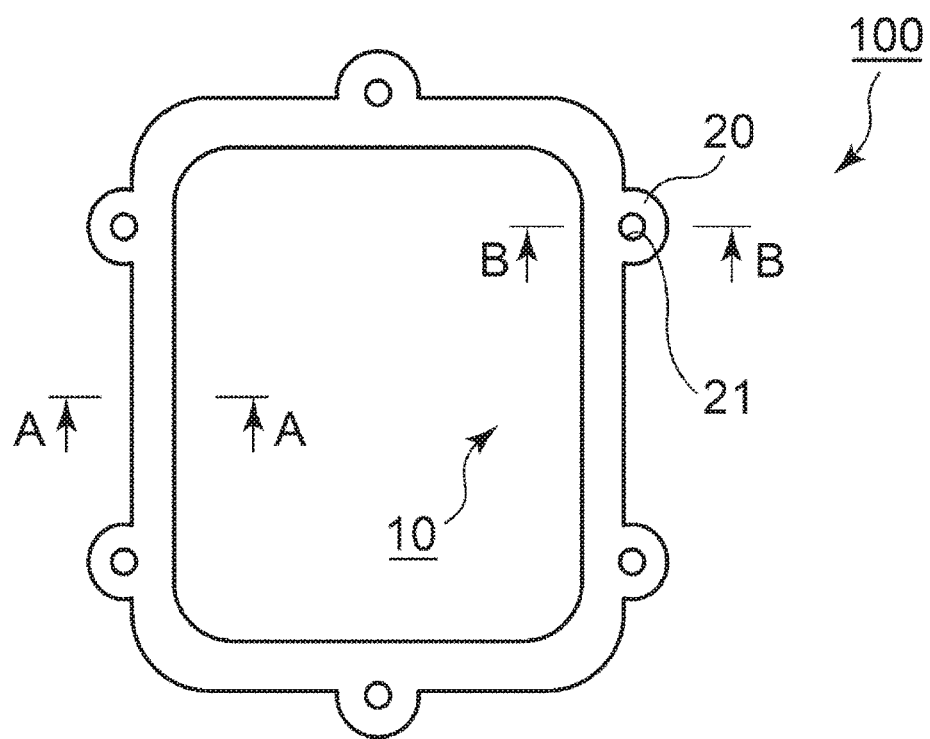
FIG. 1 is a plan view of a gasket according to an embodiment of the present disclosure.

Referring to the drawings, the following will illustratively describe modes for carrying out this disclosure in detail on the basis of embodiments. It should be noted that, unless particularly specified otherwise, the dimensions, materials, shapes, relative arrangement or the like of components described in the embodiments are not intended to limit the scope of this disclosure thereto.

Embodiment 1

Figure 2:
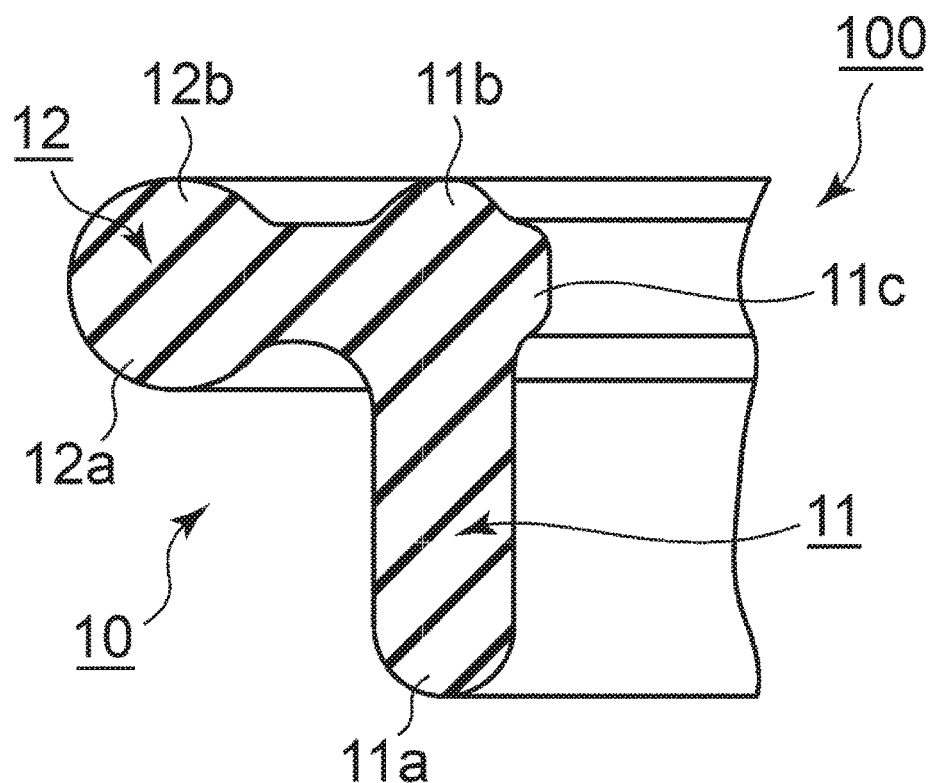
FIG. 2 is a schematic cross-sectional view of a gasket according to Embodiment 1.
Figure 3:
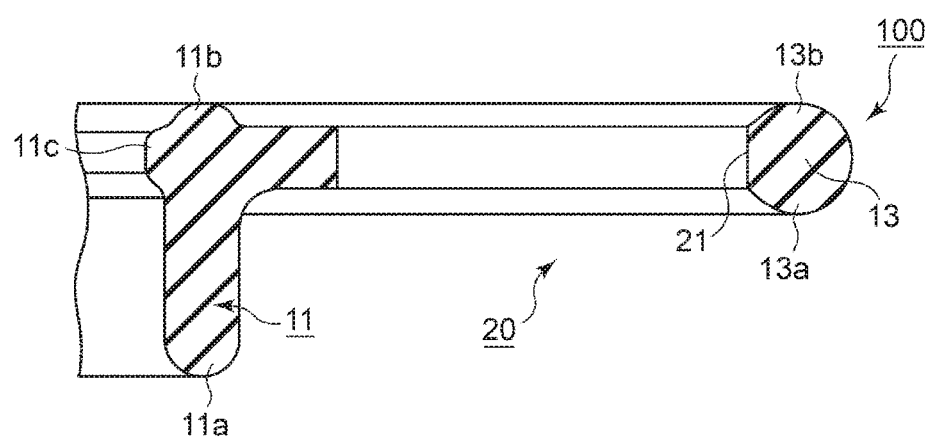
FIG. 3 is a schematic cross-sectional view of the gasket according to Embodiment 1.
Figure 4:
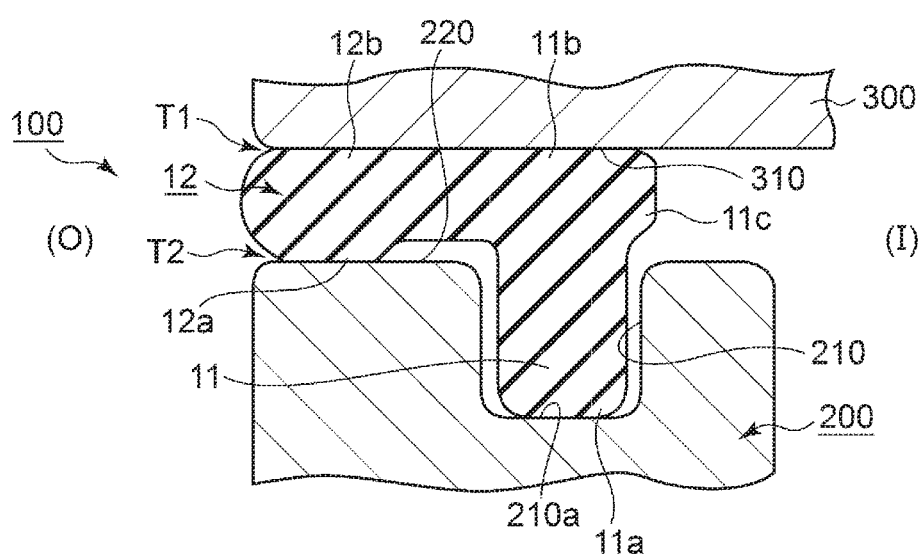
FIG. 4 is a schematic cross-sectional view of a sealing structure including the gasket according to Embodiment 1.

Referring to FIGS. 1 to 4, a gasket according to Embodiment 1 will be described. FIG. 1 is a plan view of a gasket according to an embodiment of the present disclosure. FIG. 2 is a schematic cross-sectional view of the gasket according to Embodiment 1, which is the cross-sectional view along the line AA in FIG. 1. FIG. 3 is a schematic cross-sectional view of the gasket according to Embodiment 1, which is the cross-sectional view along the line BB in FIG. 1. FIG. 4 is a schematic cross-sectional view of a sealing structure including the gasket according to Embodiment 1. Note that the gasket in FIG. 4 corresponds to a cross section along the line AA in FIG. 1.

<Sealing Structure>

Referring particularly to FIG. 4, a description will be given of the sealing structure including a gasket 100 according to the present embodiment. The gasket 100 is used to seal the gap between two members fixed to each other. For brevity, the two members are referred to respectively as an installation member 200 and a fixation member 300. Specifically, the installation member 200 is a member to which the gasket 100 is to be installed and the fixation member 300 is a member which is to be fixed to the installation member 200. The installation member 200 has an annular groove 210. The gasket 100 is configured to be in close contact with a bottom surface 210a of the annular groove 210 and with an end surface 310 of the fixation member 300. Thus, the gap between the installation member 200 and the fixation member 300 is sealed. In other words, the inside (I) of the device and the outside (O) of the device are isolated from each other. The fixation member 300 may be a housing and the installation member 200 may be a cover covering an opening in the housing, for example. The installation member 200 and the fixation member 300 may be made of, aluminum alloy or magnesium alloy. Alternatively, either the installation member 200 or the fixation member 300 may be made of resin.

<Gasket>

A more detailed description will be given of a configuration of the gasket 100. The gasket 100 is formed of a rubber-like elastic substance. The gasket 100 may be made of synthetic rubber containing at least one of nitrile rubber, styrene-butadiene rubber, fluoro-rubber, acrylic rubber, and silicon rubber, for example. The gasket 100 has an annular portion 10 and a plurality of mounting portions 20 provided integrally with the annular portion 10. The mounting portions 20 allow the gasket 100 to be fixed to the installation member 200 and to the fixation member 300. The mounting portions 20 has insertion holes 21 in which shank portions of bolts (not shown) are inserted to fix the installation member 200 and the fixation member 300 to each other.

The gasket 100 has an annular gasket main body 11 to be fitted into the annular groove 210 provided in the installation member 200 and auxiliary seal portions 12 and 13. The gasket main body 11 is configured to be in close contact with the bottom surface 210a of the annular groove 210 and with the end surface 310 of the fixation member 300. The gasket main body 11 has an annular seal projection 11a on the installation member side to be in close contact with the bottom surface 210a of the annular groove 210 and an annular seal projection 11b on the fixation member side to be in close contact with the end surface 310 of the fixation member 300. The tip end of the annular seal projection 11b on the fixation member side is formed of a plane.

The gasket main body 11 has the auxiliary seal portion 12 in the region other than the regions where the mounting portions 20 are provided and the auxiliary seal portion 13 in each of the regions where the mounting portions 20 are provided. The auxiliary seal portion 12 extends from the gasket main body 11 toward an opposite region (the outside (O) of the device) opposite to a sealed region (the inside (I) of the device). The auxiliary seal portion 12 is configured to be in close contact with an end surface 220 of the installation member 200 on the outside (O) of the device with respect to the annular groove 210 and with the end surface 310 of the fixation member 300. The auxiliary seal portion 13 is similarly configured.

Each of the auxiliary seal portions 12 and 13 has a round shape cross-section. Thus, the auxiliary seal portion 12 has an annular projection 12a on the installation member side configured to be in close contact with the end surface 220 of the installation member 200 and an annular projection 12b on the fixation member side configured to be in close contact with the end surface 310 of the fixation member 300. Likewise, the auxiliary seal portion 13 has an annular projection 13a on the installation member side configured to be in close contact with the end surface 220 of the installation member 200 and an annular projection 13b on the fixation member side configured to be in close contact with the end surface 310 of the fixation member 300.

The gasket main body 11 of the gasket 100 has an annular projection 11c on the inner peripheral side projecting toward the sealed region (the inside (I) of the device) at a position opposite to the auxiliary seal portion 12.

<Advantages of Gasket According to Present Example>

The gasket 100 has the auxiliary seal portions 12 and 13 extending from the gasket main body 11 toward the opposite region (outside (O) of the device). This causes sealing performance provided by the auxiliary seal portions 12 and 13 to be impaired first under an environment in which a corrosive solution (such as a liquid containing H2O, NaCl, or CaCl2) may cause corrosion. Specifically, the corrosive solution may adhere to and remain near the arrows T1 and T2 shown in FIG. 4, and then the installation member 200 and/or the fixation member 300, which is made of aluminum alloy, for example, may be corroded at a region where the corrosive solution adheres to.

Figure 9:
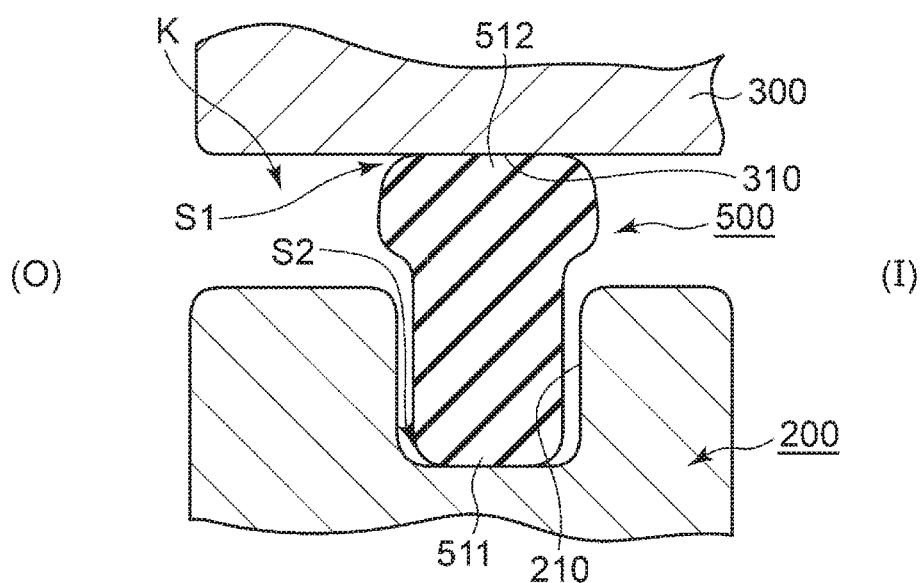
FIG. 9 is a schematic cross-sectional view of a sealing structure including the gasket according to the conventional example.

Specifically, the installation member 200 and the fixation member 300 are kept in a state where the corrosive solution adheres thereto at the regions where the auxiliary seal portions 12 and 13 are in close contact with, then corrosion progresses by the corrosive solution which adheres to the regions where the auxiliary seal portions 12 and 13 are in close contact with, and then the corrosion makes the outside (O) of the device and the inside (I) of the device be communicated with each other through the corroded region, thus the sealing performance provided by the auxiliary seal portions 12 and 13 is impaired first. Following the impairment of the sealing performance provided by the auxiliary seal portions 12 and 13, the corrosive solution may intrude into a region nearer to the inside (I) of the device, and then the corrosive solution may adhere to the installation member 200 and the fixation member 300 at a region where the gasket main body 11 is in close contact with. Consequently, the state with adhesion of the corrosive solution is kept in a similar manner as described above, resulting in impairment of sealing performance. Thus, the sealing performance provided by the auxiliary seal portions 12 and 13 is firstly impaired, and then the sealing performance provided by the gasket main body 11 is secondly impaired. Therefore durability of the sealing performance of the gasket 100 as a whole can be improved. Note that, the conventional example as illustrated in FIG. 9 has a relatively large space K defined by the gasket 500, the end surface of the installation member 200, and the end surface of the fixation member 300, and the space K tends to allow the corrosive solution to be accumulated therein. By contrast, the auxiliary seal portions 12 and 13 of the gasket 100 reduce the space which allows the corrosive solution to be accumulated therein. Such space is substantially eliminated particularly in the present embodiment as illustrated in FIG. 4 because the respective outer peripheral surfaces of the auxiliary seal portions 12 and 13 are configured to be substantially flush with the respective side surfaces of the installation member 200 and the fixation member 300. Thus, progress of corrosion caused by the corrosive solution can be slowed down because the space allowing the corrosive solution to be accumulated is small. This can prolong the time taken to make the outside (O) of the device and the inside (I) of the device be communicated with each other through the corroded region in the seal surface. Therefore, durability of the sealing performance of the gasket 100 as a whole can be improved.

The gasket main body 11 of the gasket 100 has the annular projection 11c on the inner peripheral side projecting toward the inside (I) of the device at a position opposite to the auxiliary seal portion 12. This inhibits the reaction force of the gasket main body 11 (particularly the annular seal projection 11b on the fixation member side) from being reduced. The reaction force exerted by the annular seal projection 11b on the fixation member side may not be set rather large so as to prevent the fixation member 300 from being deformed by the pressing force of the annular seal projection 11b on the fixation member side, especially in a case where the fixation member 300 is made of resin, for example. At the same time, excessively small reaction force of the annular seal projection 11b on the fixation member side may make the sealing performance provided by the annular seal projection 11b on the fixation member side insufficient. Addressing these issues, the annular projection 11c on the inner peripheral side configured as above makes it possible to set the reaction force exerted by the annular seal projection 11b on the fixation member side at a level appropriate for the sealing performance, while preventing the fixation member 300 from being deformed.

In addition, the gasket main body 11 of the gasket 100 has the annular seal projection 11b on the fixation member side on the end surface 310 side of the fixation member 300, the annular seal projection 11b having the plane with the tip end configured to be in close contact with the end surface 310. This increases the contacting area between the end surface 310 of the fixation member 300 and the annular seal projection 11b on the fixation member side. Thus, the period before the sealing performance is impaired can be prolonged even when corrosion progresses in the sealed portion by the annular seal projection 11b on the fixation member side.

Embodiment 2

Figure 5:
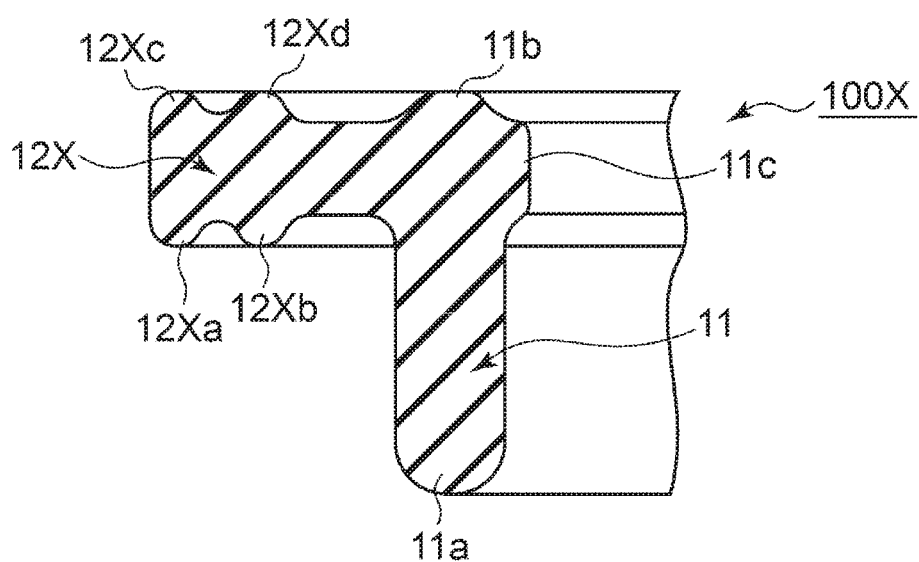
FIG. 5 is a schematic cross-sectional view of a gasket according to Embodiment 2.
Figure 6:
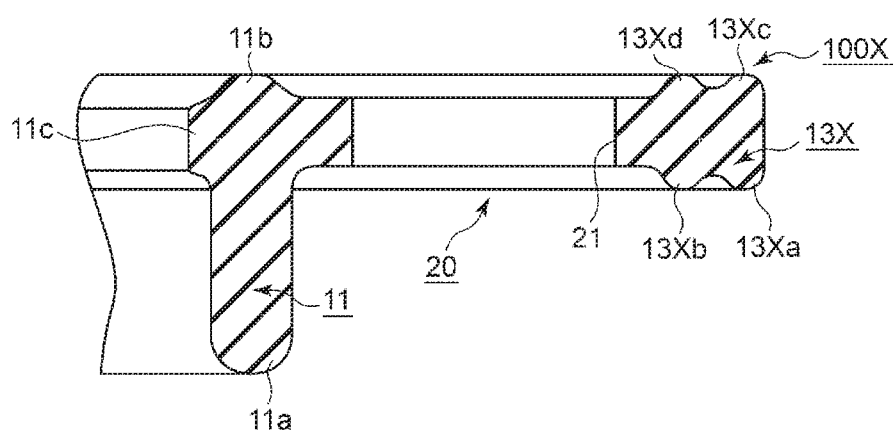
FIG. 6 is a schematic cross-sectional view of the gasket according to Embodiment 2.
Figure 7:
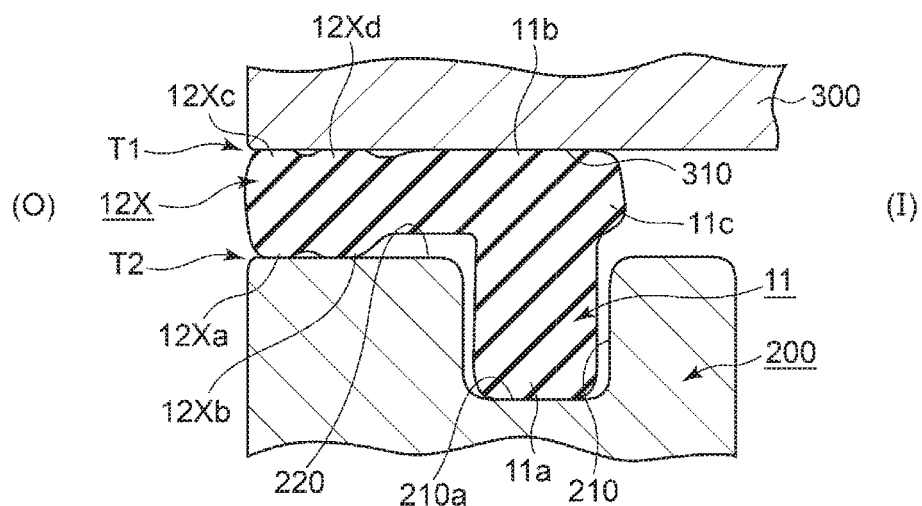
FIG. 7 is a schematic cross-sectional view of a sealing structure including the gasket according to Embodiment 2.
Figure 8:
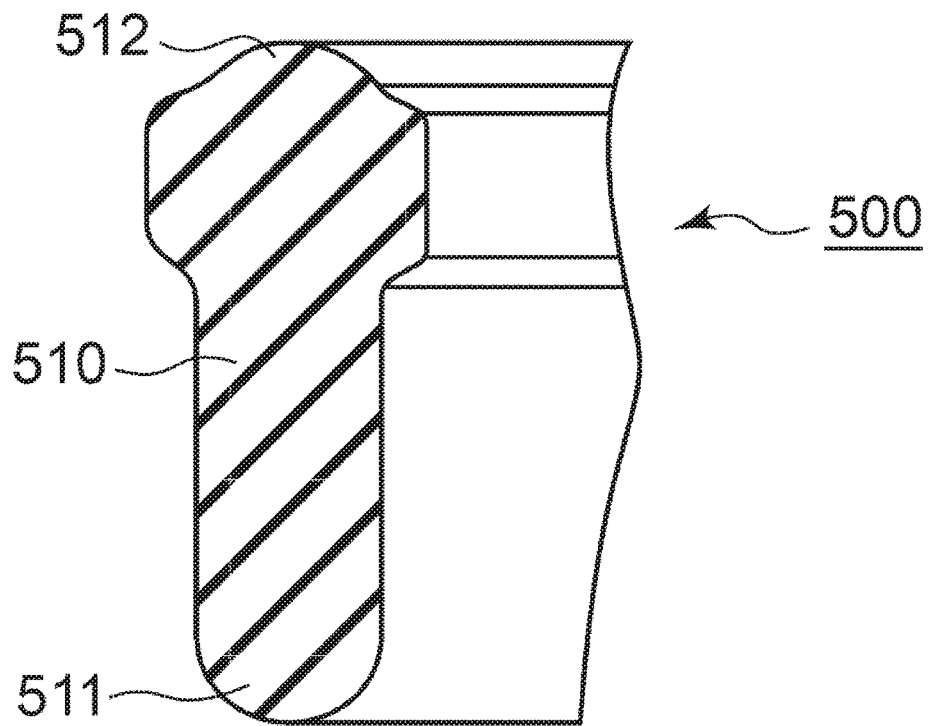
FIG. 8 is a schematic cross-sectional view of a gasket according to a conventional example.

FIGS. 5 to 7 show Embodiment 2 of the present disclosure. Embodiment 2 is configured to have two annular projections on the installation member side and two annular projections on the fixation member side in the auxiliary seal portion, while Embodiment 1 is configured to have one annular projection on the installation member side and one annular projection on the fixation member side in the auxiliary seal portion. Since configurations and mechanisms in Embodiment 2 are otherwise the same as in Embodiment 1, the same components are denoted by the same reference numerals and a description thereof may be omitted.

FIG. 5 is a schematic cross-sectional view of a gasket according to Embodiment 2, which corresponds to a cross-sectional view along the line AA in FIG. 1. FIG. 6 is a schematic cross-sectional view of the gasket according to Embodiment 2, which corresponds to a cross-sectional view along the line BB in FIG. 1. FIG. 7 is a schematic cross-sectional view of a sealing structure including the gasket according to Embodiment 2. Note that the gasket in FIG. 7 corresponds to a cross section along the line AA in FIG. 1.

Since the sealing structure is the same as Embodiment 1, a description thereof is omitted. A gasket 100X has an annular gasket main body 11 configured to be fitted into an annular groove 210 provided in an installation member 200 and auxiliary seal portions 12X and 13X. Since the configuration of the gasket main body 11 is the same as Embodiment 1, a description thereof is omitted.

The gasket main body 11 has the auxiliary seal portion 12X in the region other than the regions where the mounting portions 20 are provided and the auxiliary seal portion 13X in each of the regions where the mounting portions 20 are provided. The auxiliary seal portion 12X extends from the gasket main body 11 toward the opposite region (the outside (O) of the device) opposite to the sealed region (the inside (I) of the device). The auxiliary seal portion 12X is configured to be in close contact with the end surface 220 of the installation member 200 on the outside (O) of the device with respect of the annular groove 210 and with the end surface 310 of the fixation member 300. The auxiliary seal portion 13X is similarly configured.

The auxiliary seal portion 12 has annular projections 12Xa and 12Xb on the installation member side configured to be in close contact with the end surface 220 of the installation member 200 and annular projections 12Xc and 12Xd on the fixation member side configured to be in close contact with the end surface 310 of the fixation member 300. Likewise, the auxiliary seal portion 13X has annular projections 13Xa and 13Xb on the installation member side configured to be in close contact with the end surface 220 of the installation member 200 and annular projections 13Xc and 13Xd on the fixation member side configured to be in close contact with the end surface 310 of the fixation member 300. Thus, Embodiment 2 has two annular projections on the installation member side and two annular projections on the fixation member side.

The gasket 100X provides the same effects as obtained in Embodiment 1. In addition, since each of the auxiliary seal portions 12 and 13 of Embodiment 2 has the two annular projections on the installation member side and the two annular projections on the fixation member side, after the sealing performance provided by the annular projection on the installation member side or the annular projection on the fixation member side nearer to the outside (O) of the device is impaired, the sealing performance is maintained by the annular projection on the installation member side or the annular projection on the fixation member side nearer to the inside (I) of the device. Then, if it comes to that the sealing performance provided by the annular projection on the installation member side or the annular projection on the fixation member side on the inside (I) of the device is impaired, the sealing performance of the gasket 100X as a whole may be going to be impaired. Thus, the period before the sealing performance is impaired can further be prolonged.

(Others)

Each of the number of the annular projections on the installation member side and the number of the annular projections on the fixation member side is not particularly limited, and it is also possible to provide the three or more annular projections on the installation member side and the three or more annular projections on the fixation member side. Alternatively, the number of the annular projections on the installation member side and the number of the annular projections on the fixation member side may not be the same.

The gasket 100 or 100X in above described embodiments has one annular gasket main body 11, though another embodiment may have a plurality of annular gasket main bodies which are coupled to each other.

REFERENCE SIGNS LIST 100, 100X Gasket
10 Annular portion
11 Gasket main body
11a Annular seal projection on the installation member side
11b Annular seal projection on the fixation member side
11c Annular projection on the inner peripheral side
12, 13, 12X, 13X Auxiliary seal portion
12a, 13a, 12Xa, 12Xb, 13Xa, 13Xb Annular projection on the installation member side
12b, 13b, 12Xc, 12Xd, 13Xc, 13Xd Annular projection on the fixation member side
20 Mounting portion
21 Insertion hole
200 Installation member
210 Annular groove
210a Bottom surface
220 End surface
300 Fixation member
310 End surface

The invention claimed is:

1. A gasket configured to seal a gap between two members fixed to each other,
one of the two members being an installation member in which the gasket is to be installed, the installation member including an end surface and an annular groove recessed relative to the end surface; and
the other of the two members being a fixation member which is to be fixed to the installation member,
the gasket comprising:
an annular gasket main body configured to be fitted into the annular groove provided in the installation member and configured to be in close contact with a bottom surface of the annular groove and with an end surface of the fixation member; and
an auxiliary seal portion extending from the gasket main body toward an opposite region, which is opposite to a sealed region, the auxiliary seal portion being configured to be in close contact with the end surface of the installation member on the opposite region side of the annular groove and with the end surface of the fixation member, wherein
the auxiliary seal portion has:
at least one annular projection on the installation member side which is configured to be in close contact with the end surface of the installation member; and
at least one annular projection on the fixation member side which is configured to be in close contact with the end surface of the fixation member.

2. The gasket according to claim 1, wherein the auxiliary seal portion has a plurality of the projections on the installation member side.

3. The gasket according to claim 1, wherein the auxiliary seal portion has a plurality of the projections on the fixation member side.

4. The gasket according to claim 1, wherein the gasket main body has an annular projection on the inner peripheral side projecting toward the sealed region at a position opposite to the auxiliary seal portion.

5. The gasket according to claim 1, wherein the gasket main body has an annular seal projection on the end surface side of the fixation member, the annular seal projection having a plane with a tip end configured to be in close contact with the end surface of the fixation member.

6. The gasket according to claim 1, wherein the gasket main body protrudes longer on the installation member side according to the depth of the annular groove, than on the fixation member side.

7. The gasket according to claim 1, wherein the auxiliary seal portion extends from an entirety of the gasket main body.

8. A sealing structure, comprising:
two members fixed to each other; and
a gasket that seals a gap between the two members,
one of the two members being an installation member in which the gasket is to be installed, the installation member including an end surface and an annular groove recessed relative to the end surface; and the other of the two members being a fixation member which is to be fixed to the installation member, wherein the gasket includes:

an annular gasket main body that is fitted into the annular groove and is in close contact with a bottom surface of the annular groove and with an end surface of the fixation member; and an auxiliary seal portion extending from the gasket main body toward an opposite region, which is opposite to a sealed region, the auxiliary seal portion being in close contact with the end surface of the installation member on the opposite region side of the annular groove and with the end surface of the fixation member, wherein the auxiliary seal portion has:

at least one annular projection on the installation member side which is configured to be in close contact with the end surface of the installation member; and at least one annular projection on the fixation member side which is configured to be in close contact with the end surface of the fixation member, and an outer peripheral surface of the auxiliary seal portion is substantially flush with respective side surfaces of the installation member and the fixation member.

9. The sealing structure according to claim 8, wherein the gasket main body has an annular projection on the inner peripheral side projecting toward the sealed region at a position opposite to the auxiliary seal portion.

10. The sealing structure according to claim 8, wherein the gasket main body has an annular seal projection on the end surface side of the fixation member, the annular seal projection having a plane with a tip end being in close contact with the end surface of the fixation member.

11. The sealing structure according to claim 8, wherein the gasket main body protrudes longer on the installation member side according to the depth of the annular groove, than on the fixation member side.

12. The sealing structure according to claim 8, wherein the auxiliary seal portion extends from an entirety of the gasket main body.

* * * * *